United States Patent [19]

Fugier et al.

[11] Patent Number: 4,663,419

[45] Date of Patent: May 5, 1987

[54] PHENOL-HCHO-UREA RESIN FOR A SIZING COMPOSITION, A PROCESS FOR ITS PERPARATION AND THE SIZING COMPOSITION OBTAINED

[75] Inventors: Roger Fugier, Rantigny; Charles D. de Mezerac, Gif sur Yvette, both of France; Jacky Joachim, Berwyn, Pa.; Michel Decagny, Clermont, France

[73] Assignee: Isover Saint-Gobain, Aubervilliers, France

[21] Appl. No.: 672,909

[22] Filed: Nov. 19, 1984

[30] Foreign Application Priority Data

Nov. 29, 1983 [FR] France ............................... 83 19017

[51] Int. Cl.$^4$ ............................................. C08G 14/08
[52] U.S. Cl. .................................... 528/164; 524/575; 524/596; 427/389.8; 427/421; 428/361; 428/375; 428/392; 525/504
[58] Field of Search ............... 528/164; 524/595, 596; 427/389.8, 421; 428/375, 392, 361; 525/504

[56] References Cited

U.S. PATENT DOCUMENTS

| | | | |
|---|---|---|---|
| 2,500,054 | 3/1950 | Anthony et al. | 528/164 X |
| 3,004,941 | 10/1961 | Mestdagh et al. | 524/541 |
| 3,215,585 | 11/1965 | Kneipple | 524/494 X |
| 3,306,864 | 2/1967 | Lang et al. | 523/145 |
| 3,336,185 | 8/1967 | Heibing | 427/389.8 |
| 3,380,877 | 4/1968 | Smucker et al. | 525/504 X |
| 3,404,198 | 10/1968 | Guyer | 528/164 X |
| 3,444,119 | 5/1969 | LeBlanc | 525/496 X |
| 3,547,868 | 12/1970 | Schwartzenburg et al. | 528/164 X |
| 3,549,473 | 12/1970 | LeBlanc et al. | 428/392 |
| 3,616,179 | 10/1971 | McCombs et al. | 528/164 X |
| 3,617,427 | 11/1971 | LeBlanc | 428/182 |
| 3,684,467 | 8/1972 | Smucker et al. | 528/164 X |
| 3,696,622 | 10/1972 | Tohma et al. | 528/164 X |
| 3,852,232 | 12/1974 | Bowman et al. | 523/145 |
| 3,911,046 | 10/1975 | Ackermann et al. | 528/164 X |
| 3,935,139 | 1/1976 | Ashall | 428/375 X |
| 3,956,204 | 5/1976 | Higginbottom | 528/164 X |
| 4,014,726 | 3/1977 | Fargo | 428/436 X |
| 4,095,010 | 6/1978 | Zellar et al. | 428/375 |
| 4,096,305 | 6/1978 | Wilkinson et al. | 428/375 X |
| 4,238,595 | 12/1980 | Girgis | 528/158 |
| 4,285,848 | 8/1981 | Hickson | 525/504 X |
| 4,294,879 | 10/1981 | McHenry | 427/389.8 X |
| 4,574,145 | 3/1986 | Cummings | 528/164 X |
| 4,584,340 | 4/1986 | Chi | 524/596 |

*Primary Examiner*—Howard E. Schain
*Attorney, Agent, or Firm*—Oblon, Fisher, Spivak, McClelland & Maier

[57] ABSTRACT

A condensation product of phenol, formaldehyde and urea condensed in the presence of a basic catalyst, said condensation product being a liquid and having a free phenol content below 0.5%, a free formaldehyde content below 3%, expressed by weight based on the total weight of liquid, and a dilutability, measured at 20° C., of at least equal to 1000%.

5 Claims, No Drawings

PHENOL-HCHO-UREA RESIN FOR A SIZING COMPOSITION, A PROCESS FOR ITS PERPARATION AND THE SIZING COMPOSITION OBTAINED

BACKGROUND OF THE INvENTION

1. Field of the Invention

The present invention relates to the manufacture of mineral fiber products, and in particular insulating products, in the form of felts or sheets of fibers. The manufacturing process employed includes the deposition on the fibers, by spraying or some other means, of a size based on phenoplasts or aminoplasts for bonding the fibers.

The present invention relates to a new condensation product or resin which is to enter into a sizing composition of the type described above, a process for the preparation of said product and a sizing composition containing said product.

2. Description of the Prior Art

The term "resin" as used in the context of the present invention means the product resulting from the presence of a catalyst before any curing takes place in an oven.

The properties desired of sizing compositions depend to a large extent on the characteristics of the basic resin. A good sizing composition should above all be easily sprayed and capable of covering and bonding the fibers, and at the same time it should cause little pollution.

For this purpose, the basic resin should have good long term stability and a high degree of dilutability with water. Since the concept of dilutability is particularly important, it will be defined for the purposes of the present invention as follows: The water dilutability of a resin solution is the volume of de-ionized water which can be added at a given temperature to one unit volume of this solution without producing any permanent perturbation.

It is also necessary that the basic resin should be as free as possible from any unconverted starting materials. The risk of atmospheric pollution is in fact mainly due to the presence of volatile monomers. These consist, for example, of the starting materials required for producing the resin, e.g. formaldehyde and phenol, which have been left unconverted by the reaction or regenerated in the course of sizing of the fibres or subsequently.

In order, therefore, that the sizes obtained may be as free as possible from substances causing pollution, in particular free phenol and free formaldehyde, the basic resin should contain as little residues of starting material as possible while preserving its useful qualities.

In the past, the first resins proposed were obtained from phenol and formaldehyde in a molar ratio of F/P below 2.5, urea then being introduced only together with the other sizing additives after formation and storage of the resin in order to bind the free formaldehyde. Because of the low molar ratio of formaldehyde to phenol (F/P), it is not possible to obtain a free phneol content below 1.5% of the total weight of the resin solution, and the free formaldehyde content also amounts to at least 6%. Moreover, even the introduction of a large quantity of urea into the size in order to reduce this free formaldehyde content doea not enable the formaldehyde content to be controlled.

Various methods aimed at reducing the volatile free monomer content present in a sizing composition based on a phenoplast resin have been proposed. The principle of these methods is based on the idea of increasing the initial molar ratio of formaldehyde to phenol (F/P) in order to lower the uncombined and consequently free phenol content and at the same time bind the free formaldehyde present in excess by means of nitrogen compounds, in particular urea.

Various formulations of basic resins obtained from a molar ratio of formaldehyde to phenol in the range of from 2.7 to 4.2 in the presence of a basic catalyst have been envisaged. For example in U.S. Pat. No. 3,616,179, a condensation product of phenol, formaldehyde and urea has been proposed. The product obtained has a satisfactory capacity for dilution but, because of method of preparation employed, it is not possible to achieve a very low uncombined free phenol content while preserving the satisfactory capacity for dilution. The urea is introduced into the reactor where the reaction of phenol with formaldehyde takes place at a temperature suitable for this reaction, which is of the order of 70° C. In order to avoid excessively rapid polymerization, which would entail the risk of problems of premature gelling which would prevent spraying of the sizes, the reaction of phenol with formaldehyde is blocked before most of the phenol has reacted.

In another technique as disclosed in U.S. Pat. Nos. 3,684,467 and 4,014,726, proposals have been advanced to prepare a condensation product of phenol, formaldehyde, dextrine or dicyandiamide and urea. To obtain this product, a first type of formaldehyde binding agent (dextrine or dicyandiamide) is introduced and reacted at a temperature corresponding to the reaction temperature of phenol and formaldehyde, and the urea is introduced and reacts as soon as cooling of the reaction medium has started.

Apart from the disadvantages already mentioned above regarding the incomplete conversion of phenol, this solution requires the presence of two formaldehyde binding agents. In addition, the temperature cycles are very long and require a length of time corresponding to more than one shift.

None of the solutions proposed in the prior art have ever provided a resin containing only a small proportion of free phenol and free formaldehyde in order to limit the problems of pollution, while preserving the characteristic properties of a resin suitable for entering into a sizing composition and in particular a high capacity for dilution and high stability. A need therefore continues to exist for a sizing composition which achieves these objectives.

SUMMARY OF THE INVENTION

One object of the present invention is to provide a sizing composition which does not result in significant environmental pollution.

Another object of the present invention is to provide a sizing composition which has a high capacity for dilution.

A further object of the invention is to provide a process for the preparation of a resin for a sizing composition, which resin exhibits improved use properties and enables a more effective sizing to be obtained, the process of preparation of the resin according to the invention advantageously comprising simplified operating means such as a shorter reaction cycle and the use of only one type of monomer for binding the excess formaldehyde.

Briefly, these objects and other objects of the present invention as hereinafter will become more readily apparent can be obtained by a resin which is the condensation product of phenol, formaldehyde and urea in the presence of a basic catalyst. The condensation product is a liquid having a free phenol content below 0.5%, a free formaldehyde content below 3% of the total weight of the reactive liquid, and a dilutability, as measured at 20° C., of at least 1000%. The free phenol content is preferably below 0.4%, the free formaldehyde content preferably below 0.3% and the dilutability preferably at least 2000%. An additional characteristic of the resin is that it has a dry extract content above 40%

DETAILED DESCRIPTION OF THE PREFERRED EMBODIMENTS

The resin of the present invention is prepared by reacting phenol and formaldehyde together in the presence of a basic catalyst at a temperature in the range of from 60° to 75° C., preferably at about 70° C., the molar ratio F/P being between 3 and 6, until the conversion rate of phenol is above 98%, and the reaction mixture then begins to be cooled and urea is introduced in such a quantity that the molar ratio U/P will be in the range of:

$$\text{from } \frac{F/P - 2.55}{2.6} \text{ to } \frac{F/P - 2.55}{0.7}$$

preferably $$\text{from } \frac{F/P - 2.55}{1.8} \text{ to } \frac{F/P - 2.55}{0.8}$$

At a temperature below 60° C., the reaction is too slow for industrial application, while at a temperature above 75° C. the free phenol content is too high.

The quantity of urea present in the resin depends, in fact, on contradictory requirements. In order to be certain to fix as large a quantity as possible of the free formaldehyde, it would be advantageous to introduce urea into the reaction medium in a large excess over the stoichiometric amount. However, urea introduced in too great a quantity above a certain level of the U/P molar ratio does not serve to bind any more free formaldehyde.

According to one characteristic of the present invention, the formaldehyde and phenol are reacted in the presence of a quantity of catalyst corresponding to 12 to 20% and preferably about 14% of hydroxyl ion equivalents expressed in weight of the initial phenol. The large quantity of catalyst favors the reaction of phenol with formaldehyde and also reduces the time required for maintaining the temperature without affecting the use properties of the final product, in particular its capacity for dilution. The quantity of catalyst used should, however, not be too great in order not to bring about too violent a reaction or the formation of undesirable products, in particular insoluble products.

The catalyst employed may be any alkali metal or alkaline earth metal hydroxide. Suitable catalysts include lime, barium hydroxide or one of its hydrates, and the like. However, potassium and sodium hydroxide are preferred, particularly sodium hydroxide, said alkali metal hydroxides being used in quantities of 5 to 8.5% by weight of the initial phenol.

In a preferred embodiment of the invention, urea is introduced into the reaction medium as soon as cooling begins. In order that the urea and formaldehyde may react under the best possible conditions, it is advantageous to cool the reaction mixture at a rate on the order of 1° C. per minute until a temperature of ca.35° C. is reached. The urea is introduced at a very uniform rate during this stage of cooling, preferably over a period amounting to at least half the time required for cooling the reactor and the reaction mixture.

The preparation of the resin is carried out in a temperature cycle which falls into three phases: a heating phase, a phase during which the temperature is maintained, and a cooling phase. Because of the nature of the present process, the cycle is very rapid, which is advantageous both from an economical and a technological point of view compared with the cycles described in the prior art. In particular the total duration of the cycle from charging of the reactor to the point at which the resin is obtained does not exceed 7 hours when carried out on an industrial scale, the time during which the temperature is kept constant being limited to only about 90 minutes.

According to one variation of the process of the invention, a stage of neutralization to a pH of about 7 to 7.5 may be added.

The sizing composition of the present invention can be used for coating mineral fibers, such as, for example glass fibres, by various methods and in particular by spraying. The sizing composition contains the resin according to the invention, additional urea and sizing additives. Sizing additives currently employed include silane and mineral oils, ammonia and ammonium sulfate.

According to one characteristic of the sizing composition of the present invention, the proportions of condensation product measured in parts of dry matter and of the additional urea are between 65 parts of condensation product to 35 parts of additional urea and 90 parts of condensation product to 10 parts of additional urea, preferably 80 parts to 20 parts.

Having generally described this invention, a further understanding can be obtained by reference to certain specific examples which are provided herein for purpose of illustration only and are not intended to be limiting unless otherwise specified.

All the examples described below relate to the same method of operation, details of which will be given.

Unless otherwise indicated, the percentages are percentages by weight expressed either in relation to the weight of phenol introduced or in relation to the total weight of liquid present in the reaction medium.

The results obtained for the various examples are compared with regard to the following features concerning the resin:
appearance: clear, milky;
dilutability;
final free formaldehyde content in relation to the total weight of liquid ($F1_f$);
final free phenol content in relation to the total weight of liquid ($P1_f$);
dry extract content. (To determine this, 2 g of resin in 10 cc of water contained in a dish 50 mm in diameter and 20 mm in height are exposed for 2 hours to 150° C. in a ventilated oven (dry extract %):
rate of phenol conversion. (This is the percentage of formaldehyde which has participated in the reactions with phenol and urea, based on 100% of the initial formaldehyde (Fc)); and
pH.

The resin is obtained as follows. Formaldehyde and phenol are introduced into a reactor. The mixture is then either heated or cooled with mechanical stirring until a temperature slightly above the melting point of phenol is obtained. Mechanical stirring is continued during the whole reaction cycle. The catalyst is introduced at a uniform rate and then, immediately after all the catalyst has been added, the temperature of the mixture is raised to a level suitable for optimum condensation and the formation of a dilutable resin. This temperature is maintained until the conversation rate of phenol is above 98%.

Cooling of the reactor and the reaction medium is then begun and urea is introduced. For storage, the resin is advantageously maintained under conditions of mild agitation at a temperature of approximately 16° C. It may be stored for at least 15 days.

To produce the sizing composition, additional urea and the usual additives used in a sizing formulation are added.

All the data and results of the examples described are summarized in Tables 1 and 2 below. They relate to the respective proportions of the various reactants at different stages of the process and to different features of the process (Table 1) and to the characteristics of the resins obtained (Table 2).

The data relating to the respective proportions of the various reactants are molar ratios:
of formaldehyde to phenol (F/P);
of urea to initial phenol (U/P); and
of urea to free formaldehyde at the moment of introduction of urea (U/F$_1$ at tU).

The other data given are the percentage of catalyst in proportion to initial phenol (catalyst percent), the equivalent in hydroxyl ions (percent OH/P), the moment of introduction of urea (tU), and the free formaldehyde content in relation to the reaction liquid at the moment of introduction of urea (F$_1$ at tU).

Examples 1 to 6 are in accordance within the scope of the present invention while Examples 7 to 11 are comparative reference examples which are not within the scope of the present invention.

EXAMPLE 1

282.3 g of phenol (3 mol) are added to 852 g (10.5 mol) of a 37% aqueous formaldehyde solution in a 2 liter reactor equipped with stirrer, condenser, thermometer and inlet for reactants. The temperature is regulated by means of a water bath equipped with heating resistors and controlled manually or by a contact thermometer and a cooling system.

The preliminary mixture is raised to a temperature of 45° C. with stirring, and 33.88 g of a 50% aqueous sodium hydroxide solution (0.4235 mol) and 6% by weight of initial phenol are then introduced at a uniform rate over a period of 30 minutes while the temperature is maintained at 45° C.

The temperature is then raised at a uniform rate from 45° to 70° C. over a period of 30 minutes, and then maintained at 70° C.

Cooling is then begun and urea is introduced in granular form after the temperature has been maintained at 70° C. for about 71 minutes. The free formaldehyde content is then 8.4%.

The temperature is lowered uniformly from 70° to 50° C. in 20 minutes while 211.8 g (3.528 mol) of urea in granular form are introduced very uniformly at an average rate of 10.59 g of urea per minute. Cooling is continued at the same rate down to 35° C.

The solution of resin obtained has a clear, pale yellow appearance. The amount of phenol converted is 98.1%, the amount of formaldehyde converted is 98.5%, and the dry extract is 44.3%. The dilutability of the resin is infinite.

EXAMPLE 2

The same apparatus as described for Example 1 is used. 254.6 g (2.7 mol) of phenol are added to 881.3 g (10:8 mol) of 37% formaldehyde. 30.49 g of 50% aqueous sodium hydroxide solution (0.381 mol) and 6% by weight of the initial phenol are added. The procedure is then conducted as described in Example 1, but this time the temperature is maintained at 70° C. for 90 minutes. The temperature of the reaction medium is then lowered to 60° C. in 8 minutes so that a free formaldehyde content of 10.4% is obtained. Lowering of the temperature is then continued at a uniform rate from 60° to 35° C. in the course of 20 minutes, while 270.6 g of granular urea are introduced at a uniform rate.

EXAMPLE 3

The conditions are analogous to those of Example 1 but the quantity of catalyst is modified, being increased to 8% of the sodium hydroxide or 18.9% of equivalent in hydroxyl ions.

EXAMPLE 4

The U/P ratio is different from that used in Example 1 but still within the scope of the invention. Because of the reduced U/P ratio, the final free formaldehyde content is slightly raised.

EXAMPLE 5

This is another variation of the invention in which the U/P ratio is again modified.

EXAMPLE 6

The F/P ratio and the quantity of catalyst are increased. Virtually 100% conversion of phenol and a very low free phenol content are achieved. After the reaction medium has been cooled to 35° C., it is neutralized in about 90 minutes to a pH of 7.3 with the aid of a 15% solution of sulfuric acid. This neutralization requires about 120g of acid.

All the resins obtained according to Examples 1 to 6 are stable for 15 days.

COMPARISON EXAMPLES:

EXAMPLE 7

Formaldehyde and phenol are introduced in the same F/p ratio of 3.5 as in Example 1 with the same quantity of catalyst, but no urea is introduced into the reactor. The free formaldehyde content in the final resin is raised to a level too high to enable the resin to be used in a sizing composition.

EXAMPLE 8

The F/P ratio is reduced to a value below 3 and no urea is introduced. The resin obtained does not have any of the desired characteristics, in particular the final free phenol content is 3.5% and the final free formaldehyde content is 3.2%.

EXAMPLE 9

The F/P ratio is raised above that of Example 1 to a value of 6 and no urea is introduced. The proportion of converted formaldeyhyde is found to be insufficient, and consequently the free formaldehyde content is excessive.

EXAMPLE 10

Conditions analogous to those of Example 7 are sodium hydroxide being replaced by barium hydroxide introduced in an amount corresponding to 16% by weight of phenol, i.e. 9.2% equivalents of hydroxyl ions. This catalyst imparts to the resin a milky appearance, quite apart from the other unsatisfactory properties of Example 7.

EXAMPLE 11

The same conditions as those of Example 1 are employed. Introduction of urea is begun when the temperature level of 70° C. required for the reaction of phenol with formaldehyde has been maintained for 78 minutes, and this temperature is then maintained for approximately a further 10 minutes. The reaction mixture is then cooled to 35° C. while urea continues to be introduced for 10 minutes during cooling. The rate of phenol conversion is substantially reduced and a very high level (0.8%) of final free phenol content is obtained.

After the resin has been prepared and then stored as required, the size is prepared by adding additional urea and sizing additives to the resin. The additional urea introduced into the size serves to bind the formaldehyde which is liable to be produced at the time of spraying of the size on the fibers or when the binder is cured at a high temperature to bind the fibers.

A typical sizing composition includes the following additives:

(a) 1 to 3 parts of ammonium sulfate serving as catalyst during subsequent curing of the size after it has been sprayed on the fibers;
(b) 0.1 to 1 part of silane;
(c) 1 to 15 parts of mineral oils;
(d) 6 to 12 parts of ammonia in the form of a 20% solution used to delay pre-gelling of the size and hence preserve its dilutability.

The results obtained with examples of size produced from the resins according to the present invention and with other examples produced from resins which do not come within the scope of the invention are summarized in Table 3.

Examples 12 to 14 are obtained from resins described in Examples 1, 4, and 5 above. Examples 15 and 16 correspond to resins described in Examples 7 and 10 above, which do not fall within the scope of the present invention.

All the examples obtained contain the same quantities of mineral oil, 20% ammonia solution, silane and ammonium sulfate, i.e. 0.1% of silane, 9.5% of mineral oil, 6% of ammonia, 3% of ammonium sulfate. The percentages given correspond to 100 parts of the total quantity of resin and additional urea.

In addition to the quantities of free formaldehyde (Fl%) and free phenol (Pl%) expressed by their dry matter content in the size, Table 3 indicates the quantities of these elements, expressed in mg/Nm$^3$, found in the evacuated gases. German standards, in particular, require the total quantity of pollutants to be below 20 mg/Nm$^3$. It is clear that the examples of the invention conform to these standards. The dilutability measured after 3 days storage of the size is also satisfactory. The quantity of binder fixed by glass fibers, for example, when sprayed with a sizing composition of the present invention is found to increase because of the reduction in free phenol and formaldehyde content of the size.

TABLE 1

| Ex No | F/P Mol/Mol | Catalyst | OH$^-$/P Mol OH$^-$/100 Mol P | Conversion Rate. Formaldehyde before urea % | tU: Moment and temperature of starting the introduction of urea | Fl at tU | U/Fl at Tu | U/P |
|---|---|---|---|---|---|---|---|---|
| 1 | 3.5 | NaOH | 14.1 | 69 | At the end of maintenance of temperature at 70° C. for 71 minutes | 8.4 | 1.08 | 1.18 |
| 2 | 4 | NaOH | 14.1 | 52 | In the course of cooling after 90 minutes at 70° C. and 8 minutes cooling (70 to 60° C.) | 10.4 | 0.71 | 1.06 |
| 3 | 3.5 | NaOH | 18.9 | 70 | At the end of temperature maintenance for 70 minutes at 70° C. | 8.0 | 1.08 | 1.18 |
| 4 | 3.5 | NaOH | 14.1 | 69 | At the end of temperature maintenance for 71 minutes at 70° C. | 8.3 | 0.725 | 0.78 |
| 5 | 3.5 | NaOH | 14.6 | 69 | At the end of temperature maintenance for 71 minutes at 70° C. | 8.3 | 0.363 | 0.39 |
| 6 | 5 | NaOH | 18.9 | 44 | At the end of temperature maintenance for 62 minutes at 70° C. | 13.8 | 0.725 | 1.22 |
| 7 | 3.5 | NaOH | 14.5 | 69 | — | — | — | 0 |
| 8 | 2.3 | NaOH | 8.5 | 79 | — | — | — | 0 |
| 9 | 6 | NaOH | 14.1 | 43 | — | — | — | 0 |
| 10 | 3.2 | Ba(OH)$_2$ | 9.2 | 73 | — | — | — | 0 |
| 11 | 3.2 | Ba(OH)$_2$ | 9.2 | 71 | In the course of maintenance of temperature for 78 minutes at 70° C. | 7.6 | 0.921 | 0.86 |

TABLE 2

| Ex No. | Flf % | Plf % | Dry extract % | Appearance | Dilutability % | Pc % | Fc % | pH |
|---|---|---|---|---|---|---|---|---|
| 1 | 0.28 | 0.4 | 44.3 | clear | 2000 | 98.1 | 98.5 | |
| 2 | 1.28 | 0.18 | 46.4 | clear | 2000 | 98.9 | 94 | |
| 3 | 0.28 | 0.28 | 44.7 | clear | 2000 | 98.5 | 98.5 | |
| 4 | 1.12 | 0.5 | 43 | clear | 2000 | 98 | 97 | |
| 5 | 2.9 | 0.5 | 40 | clear | 2000 | 98 | 90 | |
| 6 | 0.6 | 0.06 | 43.5 | clear | 2000 | 99.6 | 97 | 7.1 to 7.3 |
| 7 | 7.35 | 0.41 | 34 | clear | 2000 | 98 | 70 | |
| 8 | 3.2 | 3.5 | 41 | clear | 1000 | 88 | 85 | |
| 9 | 16.3 | 0.13 | 35 | milky | 2000 | 99.4 | 43 | |
| 10 | 6.6 | 1 | 37.6 | milky | 2000 | 95.8 | 73 | |
| 11 | 0.35 | 0.8 | 46 | milky | 2000 | 95.8 | 97.0 | |

TABLE 3

| Example | Example of corresponding resin | Parts of resin | Parts of additional urea | Fl % | Pl % | Pollution mg/Nm³ Pl | Fl | Total | Dilutability at 20° C. % |
|---|---|---|---|---|---|---|---|---|---|
| 12 | 1 | 80 | 20 | 1.6 | 0.4 | 6.8 | 5.6 | 12.4 | 1200 |
| 13 | 4 | 80 | 20 | 1.15 | 0.6 | 7.6 | 5.5 | 13.1 | 700 |
| 14 | 5 | 80 | 20 | 3.7 | 0.5 | 5.8 | 7.4 | 13.2 | 300 |
| 15 | 7 | 55 | 45 | 11 | 0.25 | 6.1 | 14.2 | 20.3 | 600 |
| 16 | 10 | 55 | 45 | 10.4 | 1.7 | 23 | 13 | 36 | 0 |

Having now fully described this invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for the preparation of phenol, formaldehyde and urea condensate for use in a sizing composition for mineral fibers wherein the phenol and formaldehyde are condensed in the presence of a basic catalyst, the molar ratio F/P of formaldehyde to phenol being between 3 and 6, the basic catalyst being in an amount of 12 to 20 moles of hydroxyl equivalent for 100 moles of initial phenol, the molar ratio U/P of urea to initial phenol being between $$\frac{F/P - 2.55}{2.6} \text{ and } \frac{F/P - 2.55}{0.7},$$

said condensate being a liquid and having a free phenol content below 0.5%, a free formaldehyde content below 3% expressed by weight based on the total weight of liquid, a water tolerance, measured at 20° C. of at least equal to 1000%, a storage stability of at least 15 days and a dry extract content of at least equal to 40% consisting essentially of:
  heating together a preliminary mixture of phenol and formaldehyde at a temperature of about 45° C,
  raising the temperature up to between Ca 60° C. and 75° C. and thereby reacting phenol and formaldehyde, after addition of a basic catalyst, and maintaining this temperature until the phenol conversion rate is above 98%,
  cooling the reaction medium and introducing urea into the reaction medium.

2. The process of claim 1, wherein said urea is introduced into the reaction medium as soon as cooling is begun.

3. The process according to claim 2, wherein said reaction medium is cooled to about 35° C. at a rate of the order of 1° C. per minute.

4. The process according to claim: 2, wherein said urea is introduced into said reaction medium during a period equal to at least half the time required to cool the reaction medium.

5. the process of claim 1, wherein the duration of the temperature maintaining phase does not exceed 90 minutes.

* * * * *